April 29, 1958  F. F. CARIAGA  2,832,657
TABLE FOR AN AUTOMOBILE BACK SEAT
Filed Aug. 30, 1956
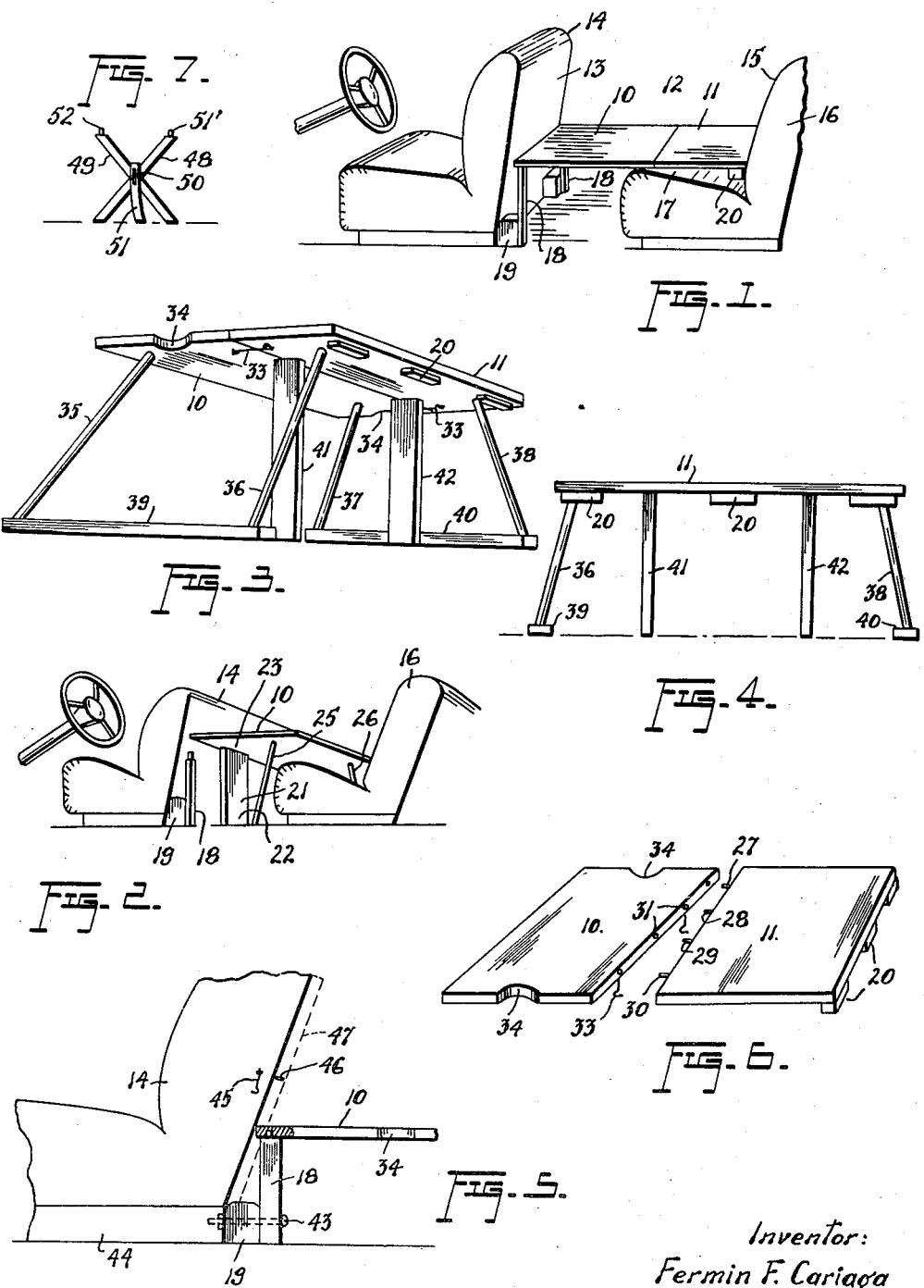
Inventor:
Fermin F. Cariaga United States Patent Office 2,832,657
Patented Apr. 29, 1958

2,832,657

TABLE FOR AN AUTOMOBILE BACK SEAT

Fermin F. Cariaga, Blue Ash, Ohio, assignor to Gadget-Of-The-Month Club, Inc., Los Angeles, Calif., a corporation of California Application August 30, 1956, Serial No. 607,043

5 Claims. (Cl. 311—21)

This invention relates to devices and attachments for use in the passenger compartments of automobiles, and more particularly to a multi-purpose table usable as a platform providing a flat surface between the front and back seats of an automobile or as a desk for the use of occupants of the back seat or as a picnic table.

In the past many devices have been offered for the purpose of holding child passengers upon the back seat while riding in the family car, but most of them have proved to be too confining and do not permit sufficient movement to keep the children satisfied during long periods of time.

One of the principal objects of my invention is the provision of a device which will fill in or cover the space between the back of the front seat and the top of the rear seat cushion in a four-door sedan, providing a clear level space on which children can be free to play with their toys and crawl about in a normal manner during long automobile trips.

Another object of my invention is the provision of a device of the character described which with a few changes can be utilized as a table serving the occupants of the rear seat as a desk or eating space.

A further object of my invention is the provision of a device of the character described which can also be completely removed from the automobile and with the addition of suitable supports may be utilized as a picnic table for outdoor dining and living purposes.

A still further object of my invention is the provision of a multi-purpose device of the character described which also will be demountable and can be positioned in a manner which will leave the car free for normal use, yet be available for immediate service when desired.

In brief, my invention includes a sectional rigid panel composed of edge-jointed leaves and provided with removable legs of various lengths which is adapted for use as a platform making a level floor or surface between the back of the front seat and the front of the rear seat backrest. If desired, the section of the panel adjacent the back of the front seat may be elevated above the platform position to provide knee room between the top of the rear seat cushion and the underside of the panel, so as to serve as a table for the occupants of the back seat; or the device may be completely removed from the automobile and fitted with longer legs with which it may be used as an outdoor camp or picnic table.

Certain further objects of my invention will become apparent in the following specification thereof when read with reference to the accompanying drawings, in which:

Figure 1 is a perspective diagrammatic and fragmentary side view of the interior of a car showing a device of my invention installed between the front and rear seats;

Figure 2 is a view similar to Figure 1, but from a lower angle, showing the device utilized as a table for occupants of the back seat;

Figure 3 is a perspective diagrammatic view taken substantially from ground level, showing the device set up for use as a picnic table;

Figure 4 is a side view of the table seen in Figure 3;

Figure 5 is a side elevational view of the lower portion of the front seat of the automobile revealing details of the installation of the device;

Figure 6 is a perspective diagrammatic view of two panels comprising the top assembly; and Figure 7 is a front elevational view of an alternate leg assembly.

Reference is again made to Figure 1 which shows the relative positioning of the front and rear seats and the position of the device of my invention therebetween.

Two panels, designated by the numerals 10 and 11 are joined by the conventional dowel pin jointing method along the line 12 and are contoured peripherally to fit snugly between the back 13 of the front seat 14 and the front 15 of the back seat 16. The undersurface of the panel 10 is supported on the forward portion of the top 17 of the cushion of the rear seat 16, and the forward edge of the panel 10 is supported on a plurality of posts such as 18 which are secured to spacing members such as 19 which in turn are bolted securely to the back side 13 of the basal frame of the front seat 14.

A plurality of padded wedges such as 20, visible in Figure 1, are secured to the underside of the rear edge of the panel 11 and are adapted to fill the depression in the rear seat at the junction of the cushion surface 17 with the frontal surface 15 of the rear seat backrest.

If Figure 2, which is a similar view to that of Figure 1 except from a lower angle, the positioning of the panel 10 when used as a table to serve the occupants of the rear seat 16 is clearly shown together with its central leg member 21 fitted over the crown channel 22 for the drive shaft and adapted with pins at its top 23 interfitting with bores in the undersurface of the panel 10 adjacent its frontal edge.

A pair of legs 25 and 26 are adapted with end pins which fit into bores in opposite sides of the panel 10 and are angled diagonally outwardly to provide lateral stability to the table when positioned as shown.

The conformation of the two panels 10 and 11 is better seen in Figure 6. They are conformed of light weight rigid material and are jointed by conventional means including the dowels 27, 28, 29 and 30 which fit into respective oppositely disposed bores such as 31 in the edge 32 of the panel 10. A plurality of hooks such as 33 are disposed on the underside of the panel 10 and engage eye members under the panel 11 to hold the dowel members in engagement with the bores.

The panel 10 is notched at each end as seen at 34 to provide space through which the window operators may be reached.

In Figure 3 the arrangement of the device for use as a picnic table is clearly shown including the panels 10 and 11 which are seen from the underside fitted together along the jointure line 32 and held by hook members such as 33.

The short legs 25 and 26 used in the table application within the automobile, are replaced by longer legs 35, 36, 37 and 38 pairs of which are fitted into transverse ground contact members seen at 39 and 40 by means of dowel portions entering spaced bores therein. A pair of slab-like vertical members 41 and 42 are disposed beneath the table along the jointure line 32, each being provided with an upwardly disposed pair of end dowels which enter bores in the panels 10 and 11 on each side of the jointure line 32.

The pad members 20, which serve to space the panel 11 above the rear portion of the seat cushion 17 as seen in Figure 1, are also visible as at 20 in Figure 4.

Details of the method of interfitting the post members which support the panels 10 and 11 when used as a platform, are seen in Figure 5 in which the post 18 is shown to be fastened to a spacer 19 which, in turn, is secured by means of the bolt 43 extending into the basal frame 44 of the front seat 14. Also in Figure 5, a hook 45 is shown secured to the side of the front seat 14 positioned for engagement with an eye 46 in the end edge of the panel 10 when the latter is positioned for storage against the back 13 of the seat 14 as indicated in phantom by dash lines at 47.

An alternate arrangement of the legs for use when the device is used as a table in the car, is shown in Figure 7. The leg members 48 and 49 are crossed in the form of an X and secured with a through bolt 50 which is also entered through an arcuate brace 51 which serves to stabilize the relative vertical positioning of the legs when in use. Extending upwardly from the ends of the legs 48 and 49 are dowel members 51 and 52 respectively which are engageable in spaced bores in the bottom of the panel 10. A leg assembly such as shown in the figure is used at each end of the panel 10.

While the panel 11, as best seen in Fig. 6, has been illustrated in an integral form, it should be clearly understood that said panel 11, in another preferred form, may comprise two equal parts hinged together by suitable hinge means along a hinge line which is substantially perpendicular to the junction line of the panels 10 and 11, thus allowing the panel 11 to be conveniently folded for storage in relatively small physical space.

Numerous modifications and variations of the present invention will occur to those skilled in the art after a careful study hereof. All such, properly within the basic spirit and scope of the present invention are intended to be included and comprehended herein as fully as if specifically described, illustrated and claimed herein.

The exact compositions, configurations, constructions relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A multi-purpose table comprising: a rigid panel member shaped and sized to fit in a substantially horizontal position between the rear of the front seat of an automobile and the front of the backrest of the back seat thereof; a plurality of post members being vertically disposed and fixedly attached by means of spacing members to the basal frame of said automobile, said post members having dowel portions in their upwardly extended ends enterable in bores in the undersurface of said panel member; a plurality of padded wedge members fixedly attached to the undersurface of said panel member at the rearwardly disposed edge thereof, and shaped, sized, and positioned to bear against the upper surface of the rear seat cushion adjacent the jointure thereof with the backrest of said seat.

2. The invention in accordance with claim 1 and further characterized by hook members depending from each side of said front seat and engageable respectively with eyebolts disposed in opposite edges of said panel when said panel is juxtaposed against said back seat between the back thereof and said plurality of posts adjacent thereto.

3. The invention in accordance with claim 2 being further characterized by joint means dividing said panel longitudinally into two panel sections of unequal width, the larger of said panel sections being sized in width to extend from the rearward side of said front seat rearwardly beyond the uppermost portion of said rear seat cushion, the narrower of said panel sections being sized in width to extend from the uppermost portion of said cushion rearwardly to the frontal surface of said rear seat backrest; said jointure being effective to make said panel section replaceably separable for storage between said posts and said backrest of said front seat when not in use as a platform.

4. The invention in accordance with claim 3 in which one of said panel sections is provided with a plurality of dowel portions projecting outwardly from one edge thereof, and the other of said panel sections is provided with a plurality of holes entered from one edge thereof, said holes aligning respectively with said dowel pins and receiving said pins therein.

5. The invention in accordance with claim 4 in which said panel sections are further characterized by means for holding them in jointed attachment comprising: a plurality of hooks depending from the undersurface of one of said panel sections and a plurality of eye members disposed outwardly in respective alignment from said undersurface of the other of said panel section, said hooks being engageable in said eye members to hold said panel sections in jointed adjacency.

References Cited in the file of this patent

UNITED STATES PATENTS

| | | |
|---|---|---|
| 1,061,295 | Stiles | Apr. 29, 1913 |
| 1,626,293 | Mason | Apr. 26, 1927 |
| 1,721,190 | Sleeper | July 16, 1929 |
| 2,460,712 | Peterson | Feb. 1, 1949 |
| 2,493,170 | Stiff et al. | Jan. 3, 1950 |
| 2,696,246 | Putnam | Dec. 7, 1954 |